US012613655B2

(12) United States Patent (10) Patent No.: US 12,613,655 B2
Choi et al. (45) **Date of Patent: \*Apr. 28, 2026**

(54) MEMORY CONTROLLER PERFORMING BOOTING OPERATION AND METHOD OF OPERATING THE SAME

(71) Applicant: SK hynix Inc., Icheon (KR)

(72) Inventors: Ji Hun Choi, Icheon (KR); Jeong Hyun Kim, Icheon (KR); Sung Ju Yoo, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,706

(22) Filed: May 22, 2024

(65) Prior Publication Data

US 2024/0311041 A1     Sep. 19, 2024

Related U.S. Application Data

(63) Continuation of application No. 17/752,754, filed on May 24, 2022, now Pat. No. 12,032,850.

(30) Foreign Application Priority Data

Dec. 8, 2021     (KR) ........................ 10-2021-0175060

(51) Int. Cl.
*G06F 3/06* (2006.01)

(52) U.S. Cl.
CPC ............ *G06F 3/0655* (2013.01); *G06F 3/061* (2013.01); *G06F 3/0679* (2013.01)

(58) Field of Classification Search
CPC ...... G06F 3/0604; G06F 3/061; G06F 3/0611; G06F 3/064; G06F 3/0653; G06F 3/0655; G06F 3/0656; G06F 3/0658; G06F 3/0679; G06F 9/3814; G06F 9/4406; G06F 9/44505; G11C 7/1006; G11C 7/22
See application file for complete search history.

(56) References Cited

U.S. PATENT DOCUMENTS

2021/0157732 A1* 5/2021 La Fratta ............. G11C 7/1072

FOREIGN PATENT DOCUMENTS

KR     1020160008157 A     1/2016
KR     1020190011123 A     2/2019

\* cited by examiner

*Primary Examiner* — Larry T Mackall

(57)     ABSTRACT

A memory controller includes a buffer, a prefetch controller, and a boot controller. The buffer stores workload information including a history of an expected I/O request expected to be received from a host during booting operation. The prefetch controller is configured to, before a target I/O request is received from the host after start of booting, read expected data corresponding to the expected I/O request from memory devices based on workload information, and store the expected data in the buffer. The boot controller updates the workload information based on the target I/O request depending on whether target data corresponding to the target I/O request is included in the expected data, and stores updated workload information in an area in which data is readable with a minimum number of accesses from a plurality of the memory devices.

4 Claims, 16 Drawing Sheets

STORAGE DEVICE

200

100

HOST ↔ MEMORY CONTROLLER ↔ MEMORY DEVICE

WKLD_INF

| Sequence | Read/ Write | | I/O Range | | Time Stamp | REQ FREQ |
| | I/O Type | Length | LBA Start Addr | | | |
| --- | --- | --- | --- | --- | --- | --- |
| 1 | Write | 10 | LBA 50 | | t1 | 1 |
| 2 | Read | 20 | LBA 80 | | t2, t3 | 2 |
| 3 | Read | 30 | LBA 150 | | t4 | 1 |

FIG. 11

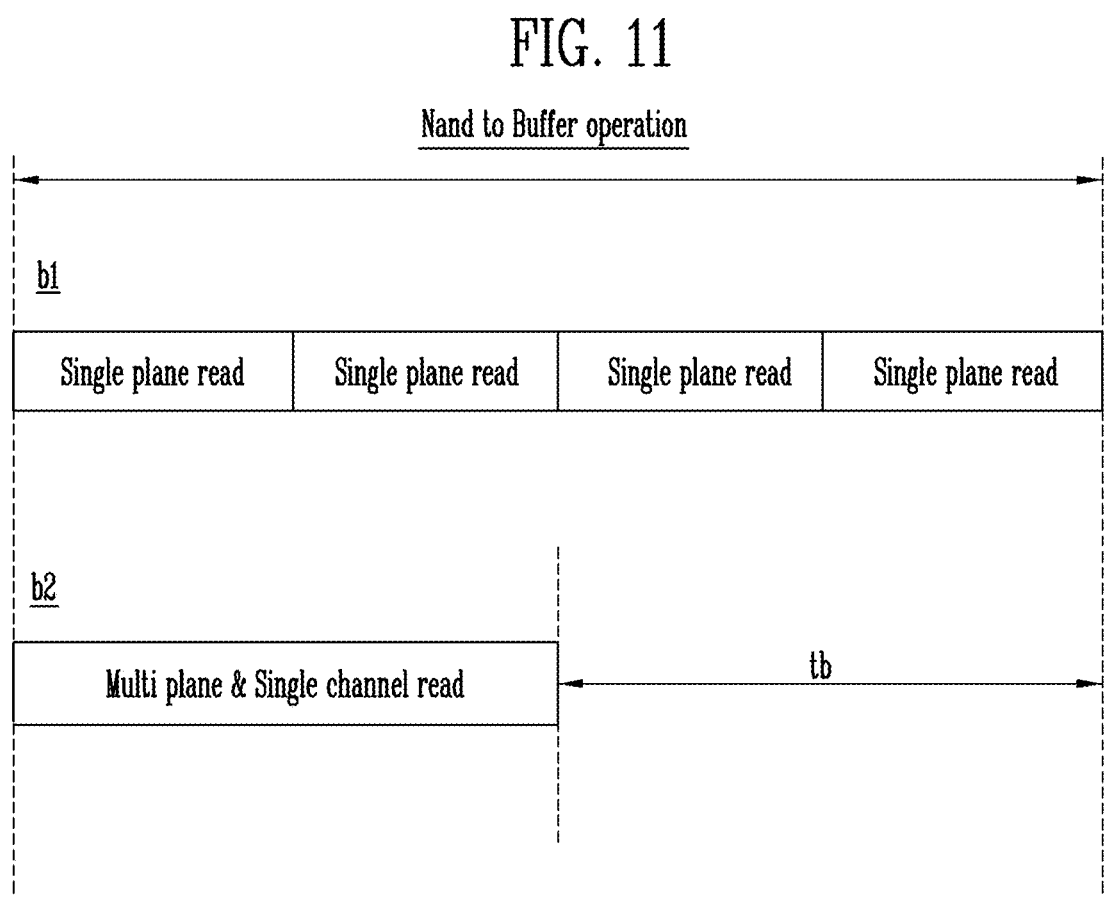

Nand to Buffer operation b1

| Single plane read | Single plane read | Single plane read | Single plane read | b2

| Multi plane & Single channel read | tb

FIG. 12

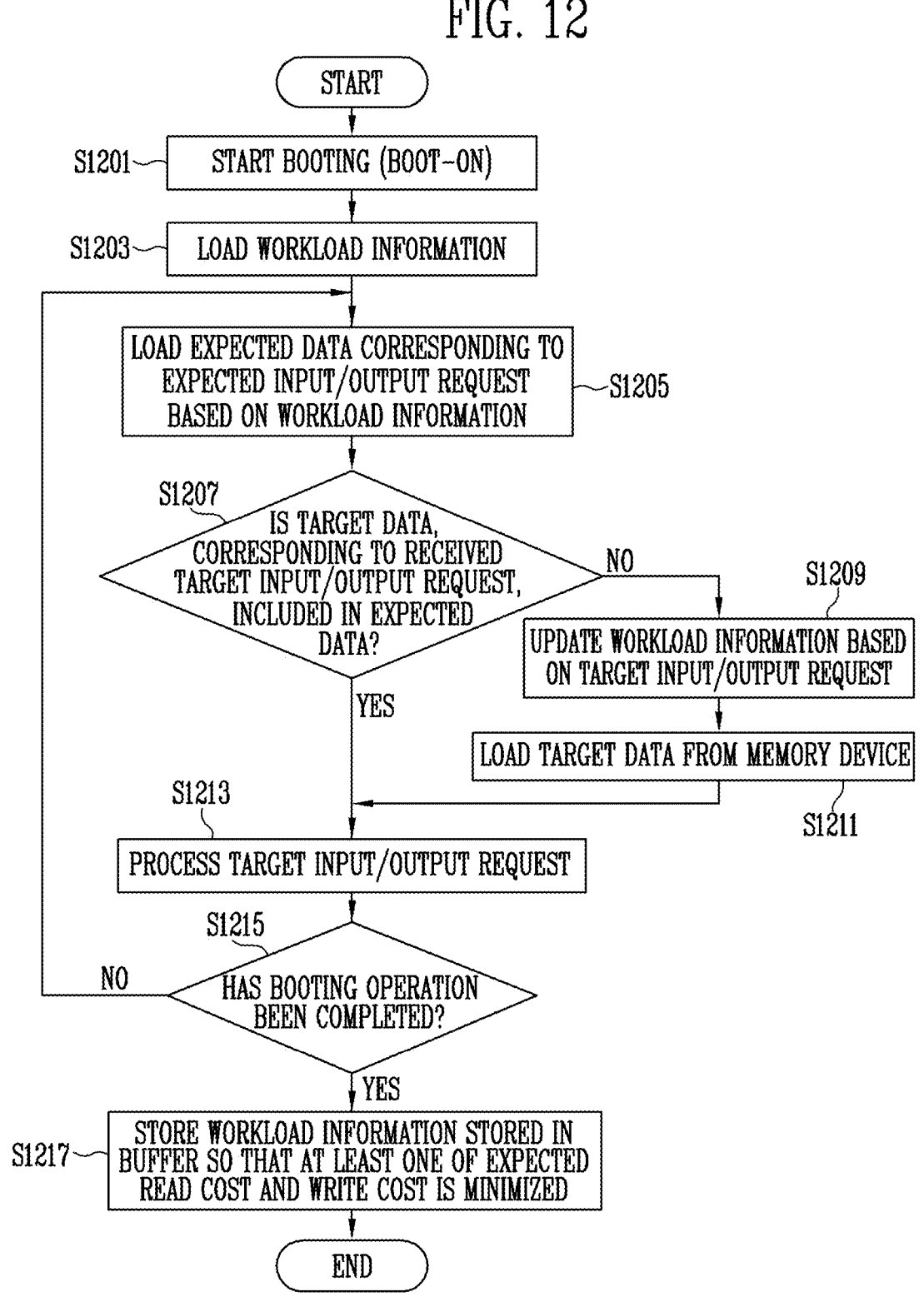

START

S1201 — START BOOTING (BOOT-ON)

S1203 — LOAD WORKLOAD INFORMATION

LOAD EXPECTED DATA CORRESPONDING TO EXPECTED INPUT/OUTPUT REQUEST BASED ON WORKLOAD INFORMATION — S1205

S1207 — IS TARGET DATA, CORRESPONDING TO RECEIVED TARGET INPUT/OUTPUT REQUEST, INCLUDED IN EXPECTED DATA?

NO → S1209 — UPDATE WORKLOAD INFORMATION BASED ON TARGET INPUT/OUTPUT REQUEST

LOAD TARGET DATA FROM MEMORY DEVICE — S1211

YES

S1213 — PROCESS TARGET INPUT/OUTPUT REQUEST

S1215 — HAS BOOTING OPERATION BEEN COMPLETED?

NO

YES

S1217 — STORE WORKLOAD INFORMATION STORED IN BUFFER SO THAT AT LEAST ONE OF EXPECTED READ COST AND WRITE COST IS MINIMIZED

END

FIG. 13

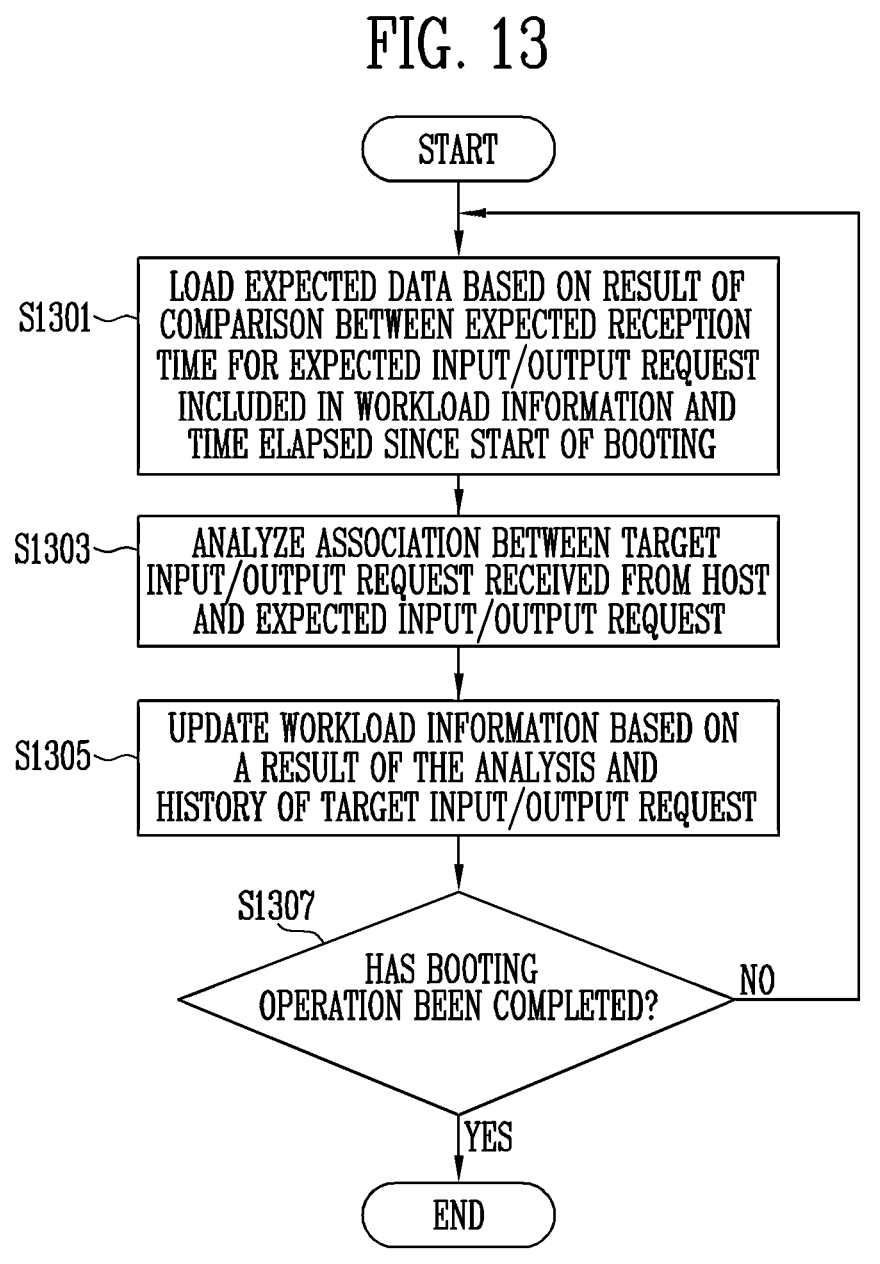

START

S1301 — LOAD EXPECTED DATA BASED ON RESULT OF COMPARISON BETWEEN EXPECTED RECEPTION TIME FOR EXPECTED INPUT/OUTPUT REQUEST INCLUDED IN WORKLOAD INFORMATION AND TIME ELAPSED SINCE START OF BOOTING

S1303 — ANALYZE ASSOCIATION BETWEEN TARGET INPUT/OUTPUT REQUEST RECEIVED FROM HOST AND EXPECTED INPUT/OUTPUT REQUEST

S1305 — UPDATE WORKLOAD INFORMATION BASED ON A RESULT OF THE ANALYSIS AND HISTORY OF TARGET INPUT/OUTPUT REQUEST

S1307 — HAS BOOTING OPERATION BEEN COMPLETED? — NO

YES

END

MEMORY CONTROLLER PERFORMING BOOTING OPERATION AND METHOD OF OPERATING THE SAME

CROSS-REFERENCE TO RELATED APPLICATIONS

The present application is a continuation of U.S. patent application Ser. No. 17/752,754 filed on May 24, 2022, which claims priority under 35 U.S.C. § 119(a) to Korean patent application number 10-2021-0175060, filed on Dec. 8, 2021, in the Korean Intellectual Property Office, the entire disclosure of which is incorporated herein by reference.

BACKGROUND

1. Technical Field

Various embodiments of the present disclosure generally relate to an electronic device, and more particularly to a memory controller and a method of operating the memory controller.

2. Related Art

A storage device is a device which stores data under the control of a host device, such as a computer or a smartphone. The storage device may include a memory device in which data is stored and a memory controller which controls the memory device. Such memory devices are classified into a volatile memory device and a nonvolatile memory device.

The volatile memory device is a memory device in which data is stored only when power is supplied and in which stored data is lost when the supply of power is interrupted. Examples of the volatile memory device include a static random-access memory (SRAM) and a dynamic random-access memory (DRAM).

The nonvolatile memory device is a memory device in which stored data is retained even when the supply of power is interrupted. Examples of the nonvolatile memory device include a read only memory (ROM), a programmable ROM (PROM), an electrically programmable ROM (EPROM), an electrically erasable and programmable ROM (EEPROM), a flash memory, and the like.

SUMMARY

Various embodiments of the present disclosure are directed to a memory controller having optimized booting performance and a method of operating the memory controller.

An embodiment of the present disclosure may provide for a memory controller for controlling a plurality of memory devices, each including a plurality of memory blocks. The memory controller may include a buffer, a prefetch controller, and a boot controller. The buffer may be configured to store workload information including a history of an expected input/output request that is expected to be received from a host during a booting operation. The prefetch controller may be configured to, before a target input/output request is received from the host after the booting operation starts, read expected data corresponding to the expected input/output request from the plurality of memory devices based on the workload information, and store the expected data in the buffer. The boot controller may be configured to update the workload information based on the target input/output request according to whether target data corresponding to the target input/output request is included in the expected data, and to store updated workload information in an area in which is readable with an minimum number of access from the plurality of the memory devices.

An embodiment of the present disclosure may provide for a memory controller for controlling a plurality of memory devices, each including a plurality of memory blocks. The memory controller may include a buffer, a prefetch controller, and a boot controller. The buffer may be configured to store workload information including a history of an expected input/output request that is expected to be received from a host during a booting operation. The prefetch controller may be configured to, before a target input/output request is received from the host after a booting operation starts, read expected data corresponding to the expected input/output request from the plurality of memory devices based on the workload information, and store the expected data in the buffer. The boot controller may be configured to update the workload information based on the target input/output request according to whether target data corresponding to the target input/output request is included in the expected data stored in the buffer, and to store updated workload information in any one of a main area and a buffer area of each of the plurality of memory devices according to whether to reduce write latency or to reduce a total number of write operations.

BRIEF DESCRIPTION OF THE DRAWINGS

FIG. 1 illustrates a storage device according to an embodiment of the present disclosure.

FIG. 5 illustrates a super block according to an embodiment.

FIG. 11 illustrates a reduction in a booting time according to optimized storage of workload information.

FIG. 12 is a flowchart illustrating an operation of a memory controller according to an embodiment.

FIG. 13 is a flowchart illustrating an operation of a memory controller according to an embodiment.

FIG. 16 is a block diagram illustrating a solid-state drive (SSD) system to which a storage device according to an embodiment of the present disclosure is applied.

DETAILED DESCRIPTION

Figure 2:
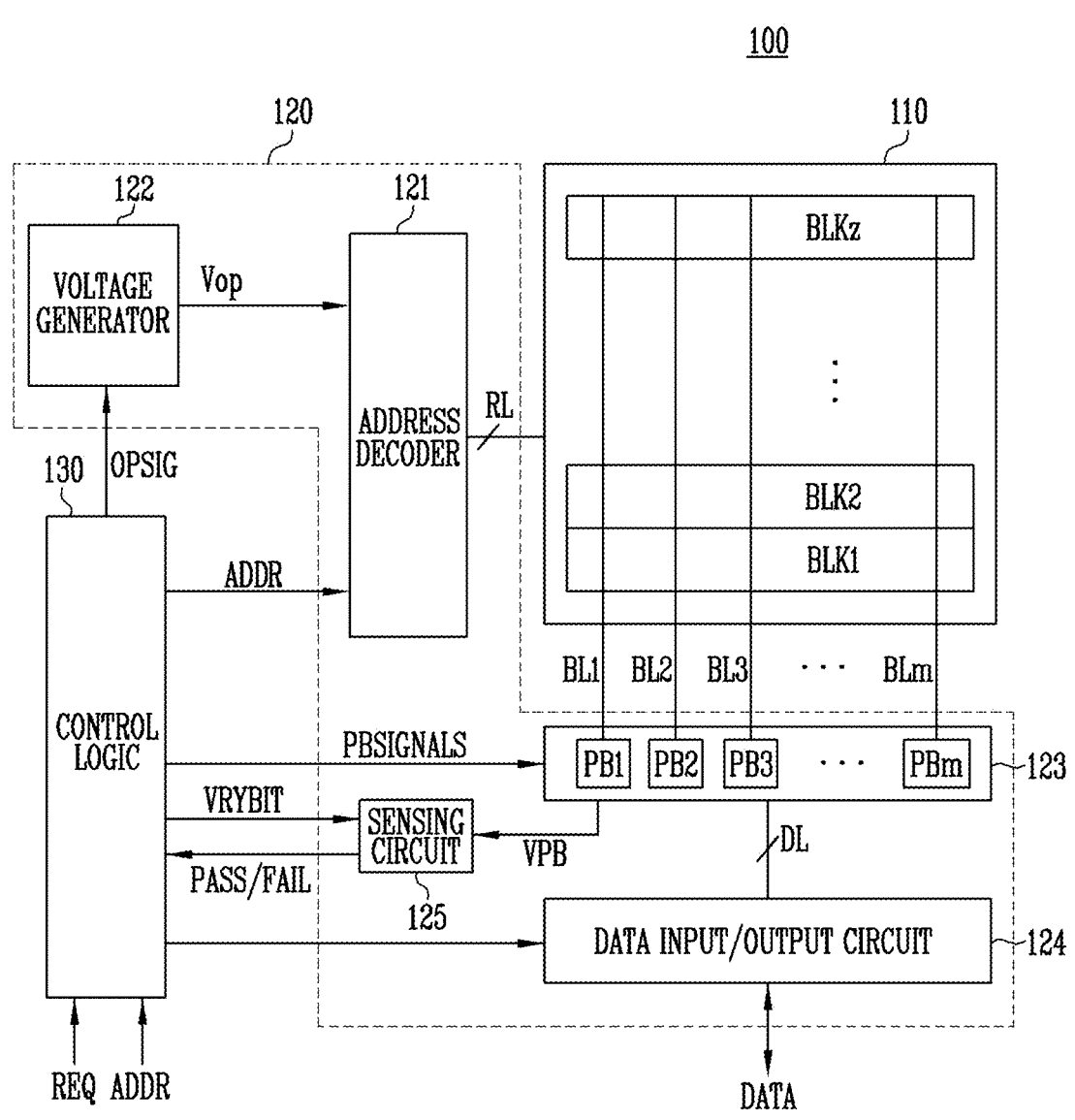
FIG. 2 illustrates a memory device of FIG. 1 according to an embodiment.

Specific structural or functional descriptions in the embodiments of the present disclosure introduced in this specification or application are exemplified to describe embodiments according to the concept of the present disclosure. The embodiments according to the concept of the present disclosure may be practiced in various forms, and should not be construed as being limited to the embodiments described in the specification or application.

Figure 1:
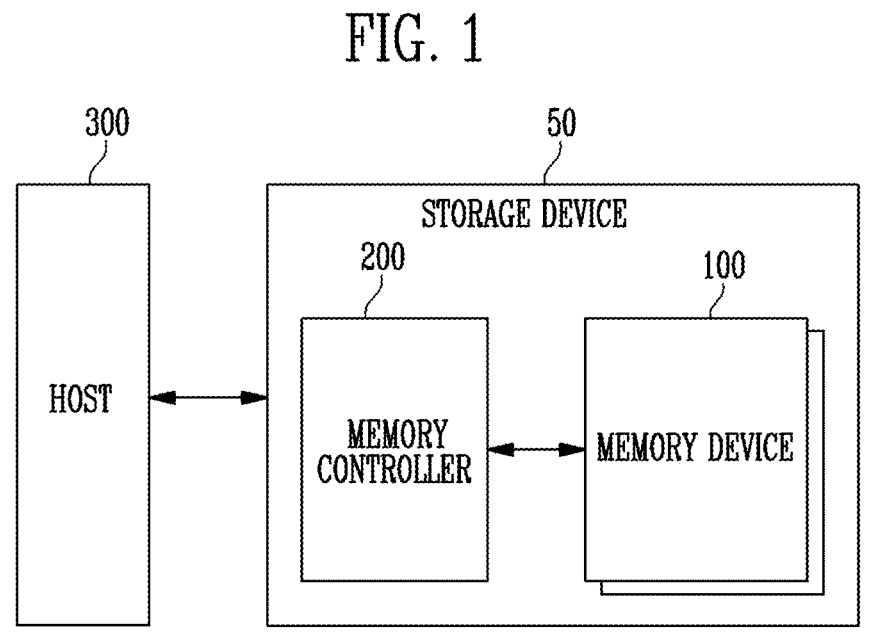

FIG. 1 illustrates a storage device 50 according to an embodiment of the present disclosure.

Referring to FIG. 1, the storage device 50 may include memory devices 100 and a memory controller 200 which controls operations of the memory devices 100. The storage device 50 may stores data under the control of a host 300 such as a mobile phone, a smartphone, an MP3 player, a laptop computer, a desktop computer, a game console, a television (TV), a tablet PC, an in-vehicle infotainment system, or the like.

The storage device 50 may be manufactured as any one of various types of storage devices depending on a host interface that is a scheme for communication with the host 300. The storage device 50 may be implemented as any one of various types of storage devices, for example, a solid state drive (SSD), a multimedia card (MMC) such as an embedded MMC (eMMC), a reduced size MMC (RS-MMC), or a micro-MMC, a secure digital (SD) card such as a mini-SD card or a micro-SD card, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, a memory stick, or the like.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

Each memory device 100 may store data. The memory device 100 operates under the control of the memory controller 200. The memory device 100 may include a memory cell array including a plurality of memory cells which store data.

Each of the memory cells may be implemented as a single-level cell (SLC) capable of storing a single data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of memory cells. A single memory block may include a plurality of pages. In an embodiment, each page may be a unit by which data is stored in the memory device 100 or by which data stored in the memory device 100 is read.

A memory block may be a unit by which data is erased. In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change RAM (PRAM), a magneto-resistive RAM (MRAM), a ferroelectric RAM (FRAM), or a spin transfer torque RAM (STT-RAM). In the present specification, for convenience of description, a description will be made on the assumption that the memory device 100 is a NAND flash memory.

The memory device 100 may receive a command and an address from the memory controller 200, and may access an area of the memory cell array, selected by the address. That is, the memory device 100 may perform an operation indicated by the command on the area selected by the address. For example, the memory device 100 may perform a write operation (i.e., program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

In an embodiment, with regard to storage areas, the memory device 100 may include a buffer area and a main area.

The buffer area may include n-bit level cell blocks in which each memory cell stores n data bits (where n is a natural number equal to or greater than 1). The main area may include m-bit level cell blocks in which each memory cell stores m data bits (where m is a natural number equal to or greater than n). Since the number of data bits stored in each memory cell included in each block in the buffer area is less than that in the main area, the buffer area has a smaller storage capacity than that of the main area, but it may be accessed faster than the main area.

In order to improve write latency performance, data may be temporarily stored in the buffer area, and thereafter the data stored in the buffer area may migrated to the main area.

When data is temporarily stored in the buffer area having an access speed higher than that of the main area, write latency may be reduced, but the total number of write operations may increase because a data migration operation must be subsequently performed. In contrast, when data is directly stored in the main area rather than in the buffer area, the write latency may increase, but the total number of write operations may decrease because there is no need to subsequently perform the data migration operation.

Write cost may be reduced by reducing the write latency or the total number of write operations depending on the purpose of the reduction.

In an embodiment, workload information including a history of an expected input/output (I/O) request may be distributed and stored in the plurality of memory devices 100. The expected input/output request represents a request that is expected to be received from the host 300 during a booting operation.

The memory controller 200 controls the overall operation of the storage device 50.

When power is applied to the storage device 50, the memory controller 200 may run firmware (FW). When the memory device 100 is a flash memory device, the memory controller 200 may run firmware such as a Flash Translation Layer (FTL) for controlling communication between the host 300 and the memory device 100.

In an embodiment, the memory controller 200 may receive data and a logical block address (LBA) from the host 300, and may translate the logical block address (LBA) into a physical block address (PBA) indicating an address of memory cells which are included in the memory device 100 and in which the data is to be stored.

The memory controller 200 may control the memory device 100 so that a program operation, a read operation, or an erase operation is performed in response to a request received from the host 300. During the program operation, the memory controller 200 may provide a write command, a physical block address (PBA), and data to the memory device 100. During the read operation, the memory controller 200 may provide a read command and a physical block address (PBA) to the memory device 100. During the erase operation, the memory controller 200 may provide an erase command and a physical block address (PBA) to the memory device 100.

In an embodiment, the memory controller 200 may autonomously generate a command, an address, and data regardless of whether a request from the host 300 is received, and may transmit them to the memory device 100. For example, the memory controller 200 may provide commands, addresses, and data to the memory device 100 so as to perform background operations, such as a program operation for wear leveling and a program operation for garbage collection.

In an embodiment, the memory controller 200 may control at least two memory devices 100. In this case, the memory controller 200 may control the memory devices 100 using an interleaving scheme to improve operating performance. The interleaving scheme may be an operating manner in which the operating periods of at least two memory devices 100 are caused to overlap each other.

The memory controller 200 may control the plurality of memory devices 100 coupled thereto through one or more channels. Each memory device 100 may include one or more planes. Each plane may include a plurality of memory blocks.

In an embodiment, after the booting (boot-on) operation starts, the memory controller 200 may load the workload information stored in the plurality of memory devices 100. Before a target input/output (I/O) request is received from the host 300 after the booting operation starts, the memory controller 200 may load expected data corresponding to the expected input/output request from the plurality of memory devices 100 thereto based on the workload information. The expected data may include data related to a booting operation on an operating system of the host 300.

In an embodiment, the memory controller 200 may load the expected data, stored in the plurality of memory devices 100, based on a result of a comparison between a time at which the expected input/output request is expected to be received (expected reception time) from the host 300 and a time elapsed since the starting of the booting operation.

The memory controller 200 may receive the target input/output request from the host 300 after the booting operation starts. The memory controller 200 may provide target data corresponding to the target input/output request to the host 300 in response to the target input/output request. The memory controller 200 may immediately provide previously loaded target data to the host 300 when the target data is included in the expected data loaded to the memory controller 200. When the target data is not included in the expected data, the memory controller 200 may load the target data stored in the plurality of memory devices 100, and may provide the loaded target data to the host 300.

The memory controller 200 may update the workload information based on the target input/output request according to whether the target data corresponding to the target input/output request is included in the expected data. For example, when the target data is not included in the expected data, the memory controller 200 may update the workload information based on the history of the target input/output request. In an embodiment, the memory controller 200 may update the workload information by modifying the history of the expected input/output request based on the history of the target input/output request.

When the booting operation is completed, the memory controller 200 may store the updated workload information in the plurality of memory devices 100 so that at least one of expected read cost and write cost is minimized.

In an embodiment, the memory controller 200 may store the updated workload information in the same super block, i.e., one super block, so as to minimize the expected read cost. The super block may include at least two memory blocks included in different memory devices, among the plurality of memory devices 100. In an embodiment, the memory controller 200 may store the updated workload information in a super block including memory blocks present in any one of the buffer area and the main area so as to minimize the write cost.

The host 300 may communicate with the storage device 50 using at least one of various communication methods such as universal serial bus (USB), serial AT attachment (SATA), serial attached SCSI (SAS), high speed interchip (HSIC), small computer system interface (SCSI), Peripheral Component Interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

FIG. 2 illustrates the memory device 100 of FIG. 1 according to an embodiment.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are coupled to an address decoder 121 through row lines RL. The memory blocks BLK1 to BLKz are coupled to a read and write circuit 123 through bit lines BL1 to BLm. Each of the memory blocks BLK1 to BLKz includes a plurality of memory cells. In an embodiment, the plurality of memory cells are nonvolatile memory cells. In the plurality of memory cells, memory cells coupled to the same word line are defined as a single physical page. That is, the memory cell array 110 is composed of a plurality of physical pages. In accordance with an embodiment of the present disclosure, each of the plurality of memory blocks BLK1 to BLKz included in the memory cell array 110 may include a plurality of dummy cells. As the dummy cells, one or more dummy cells may be coupled in series between a drain select transistor and the memory cells and between a source select transistor and the memory cells.

Each of the memory cells of the memory device 100 may be implemented as a single-level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may include the address decoder 121, a voltage generator 122, the read and write circuit 123, a data input/output circuit 124, and a sensing circuit 125.

The peripheral circuit 120 may drive the memory cell array 110. For example, the peripheral circuit 120 may drive the memory cell array 110 so that a program operation, a read operation, and an erase operation are performed on the memory cell array 110.

The address decoder 121 is coupled to the memory cell array 110 through the row lines RL. The row lines RL may include drain select lines, word lines, source select lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may be operated under the control of the control logic 130. The address decoder 121 receives addresses ADDR from the control logic 130.

The address decoder 121 may decode a block address, among the received addresses ADDR. The address decoder 121 selects at least one of the memory blocks BLK1 to BLKz according to the decoded block address. The address decoder 121 may decode a row address among the received addresses ADDR. The address decoder 121 may select at least one of word lines of the selected memory block according to the decoded row address. The address decoder 121 may apply operating voltages Vop supplied from the voltage generator 122 to the selected word line.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to the unselected word lines.

During a read operation, the address decoder 121 may apply a read voltage to the selected word line and apply a read pass voltage having a level higher than that of the read voltage to the unselected word lines.

In accordance with an embodiment of the present disclosure, the erase operation of the memory device 100 may be performed on a memory block basis. During the erase operation, the addresses ADDR input to the memory device 100 include a block address. The address decoder 121 may decode the block address and select a single memory block in response to the decoded block address. During the erase operation, the address decoder 121 may apply a ground voltage to word lines coupled to the selected memory block.

In accordance with an embodiment of the present disclosure, the address decoder 121 may decode a column address among the received addresses ADDR. The decoded column address may be transferred to the read and write circuit 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage so as to generate the plurality of operating voltages Vop having various voltage levels, and may generate the plurality of operating voltages Vop by selectively enabling the plurality of pumping capacitors under the control of the control logic 130.

The generated operating voltages Vop may be supplied to the memory cell array 110 by the address decoder 121.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm are operated under the control of the control logic 130.

The first to m-th page buffers PB1 to PBm perform data communication with the data input/output circuit 124. During a program operation, the first to m-th page buffers PB1 to PBm receive data DATA to be stored through the data input/output circuit 124 and data lines DL.

During a program operation, the first to m-th page buffers PB1 to PBm may transfer the data DATA to be stored, received through the data input/output circuit 124, to selected memory cells through the bit lines BL1 to BLm when a program pulse is applied to a selected word line. Memory cells in a selected page are programmed based on the received data DATA. Memory cells coupled to a bit line to which a program permission voltage (e.g., a ground voltage) is applied may have increased threshold voltages. Threshold voltages of memory cells coupled to a bit line to which a program inhibit voltage (e.g., a supply voltage) is applied may be maintained. During a program verify operation, the first to m-th page buffers PB1 to PBm read the data DATA stored in the selected memory cells from the selected memory cells through the bit lines BL1 to BLm.

During a read operation, the read and write circuit 123 may read data DATA from the memory cells in the selected page through the bit lines BL, and may store the read data DATA in the first to m-th page buffers PB1 to PBm.

During an erase operation, the read and write circuit 123 may allow the bit lines BL to float. In an embodiment, the read and write circuit 123 may include a column select circuit.

The data input/output circuit 124 is coupled to the first to m-th page buffers PB1 to PBm through the data lines DL. The data input/output circuit 124 is operated in response to the control of the control logic 130.

The data input/output circuit 124 may include a plurality of input/output buffers (not illustrated) which receive input data DATA. During a program operation, the data input/output circuit 124 receives the data DATA to be stored from an external controller (not illustrated). During a read operation, the data input/output circuit 124 outputs data DATA, received from the first to m-th page buffers PB1 to PBm included in the read and write circuit 123, to the external controller.

During a read operation or a verify operation, the sensing circuit 125 may generate a reference current in response to an enable bit signal VRYBIT generated by the control logic 130, and may output a pass signal or a fail signal to the control logic 130 by comparing a sensing voltage VPB received from the read and write circuit 123 with a reference voltage generated by the reference current.

The control logic 130 may be coupled to the address decoder 121, the voltage generator 122, the read and write circuit 123, the data input/output circuit 124, and the sensing circuit 125. The control logic 130 may control the overall operation of the memory device 100. The control logic 130 may be operated in response to a command CMD transmitted from an external device.

The control logic 130 may control the peripheral circuit 120 by generating various types of signals in response to the command CMD and the addresses ADDR. For example, the control logic 130 may generate an operation signal OPSIG, an address ADDR, read and write circuit control signals PBSIGNALS, and an enable bit VRYBIT in response to the command CMD and the addresses ADDR. The control logic 130 may output the operation signal OPSIG to the voltage generator 122, output the address ADDR to the address decoder 121, output the read and write circuit control signals PBSIGNALS to the read and write circuit 123, and output the enable bit VRYBIT to the sensing circuit 125. In addition, the control logic 130 may determine whether a verify operation has passed or failed in response to the pass or fail signal PASS or FAIL output from the sensing circuit 125.

Figure 3:
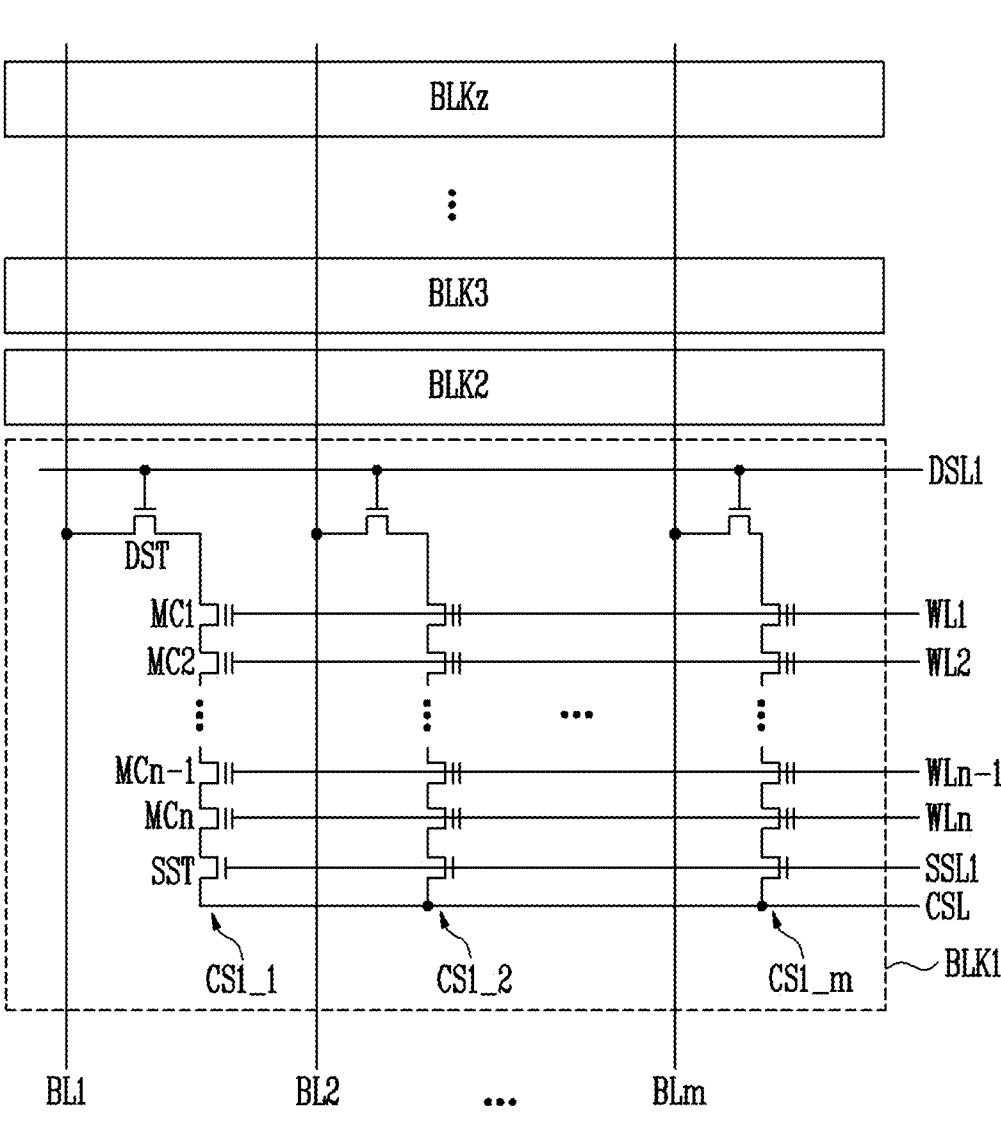
FIG. 3 illustrates a memory cell array of FIG. 2 according to an embodiment.

FIG. 3 illustrates the memory cell array 110 of FIG. 2 according to an embodiment.

Referring to FIG. 3, the first to z-th memory blocks BLK1 to BLKz are coupled in common to the first to m-th bit lines BL1 to BLm. In FIG. 3, for convenience of description, elements included in the first memory block BLK1, among the plurality of memory blocks BLK1 to BLKz, are illustrated, and illustration of elements included in each of the remaining memory blocks BLK2 to BLKz is omitted. It will be understood that each of the remaining memory blocks BLK2 to BLKz has the same configuration as the first memory block BLK1.

The first memory block BLK1 may include a plurality of cell strings CS1_1 to CS1_*m* (where m is a positive integer). The first to m-th cell strings CS1_1 to CS1_*m* are respectively coupled to the first to m-th bit lines BL1 to BLm. Each of the first to m-th cell strings CS1_1 to CS1_*m* may include a drain select transistor DST, a plurality of memory cells MC1 to MCn (where n is a positive integer) which are coupled in series to each other, and a source select transistor SST.

A gate terminal of the drain select transistor DST included in each of the first to m-th cell strings CS1_1 to CS1_*m* is coupled to a drain select line DSL1. Gate terminals of the first to n-th memory cells MC1 to MCn included in each of the first to m-th cell strings CS1_1 to CS1_*m* are coupled to first to n-th word lines WL1 to WLn, respectively. A gate terminal of the source select transistor SST included in each of the first to m-th cell strings CS1_1 to CS1_*m* is coupled to a source select line SSL1.

For convenience of description, the structure of each cell string will be described based on the first cell string CS1_1, among the plurality of cell strings CS1_1 to CS1_*m*. However, it will be understood that each of the remaining cell strings CS1_2 to CS1_*m* is configured in the same manner as the first cell string CS1_1.

A drain terminal of the drain select transistor DST included in the first cell string CS1_1 is coupled to the first bit line BL1. A source terminal of the drain select transistor DST included in the first cell string CS1_1 is coupled to a drain terminal of the first memory cell MC1 included in the first cell string CS1_1. The first to n-th memory cells MC1 to MCn may be coupled in series to each other. A drain terminal of the source select transistor SST included in the first cell string CS1_1 is coupled to a source terminal of the n-th memory cell MCn included in the first cell string CS1_1. A source terminal of the source select transistor SST included in the first cell string CS1_1 is coupled to a common source line CSL. In an embodiment, the common source line CSL may be coupled in common to the first to z-th memory blocks BLK1 to BLKz.

The drain select line DSL1, the first to n-th word lines WL1 to WLn, and the source select line SSL1 are included in the row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4:
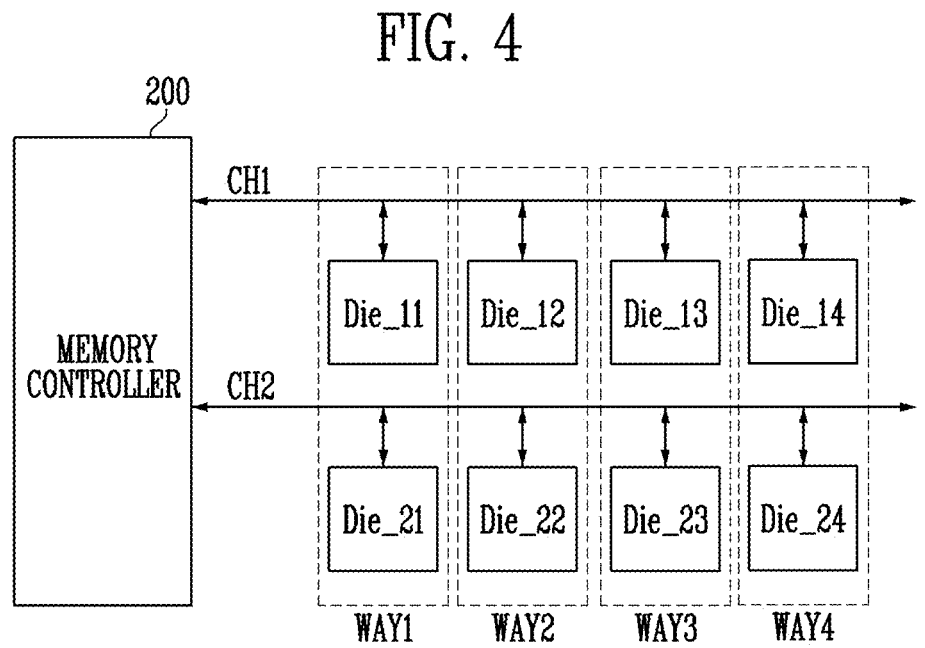
FIG. 4 illustrates a method in which a memory controller controls a plurality of memory devices coupled thereto through a plurality of channels.

FIG. 4 illustrates a method in which a memory controller controls a plurality of memory devices coupled thereto through a plurality of channels. Referring to FIG. 4, a memory controller 200 may be coupled to a plurality of memory devices Die_11 to Die_24 through a first channel CH1 and a second channel CH2. The number of channels or the number of memory devices coupled to each channel is not limited to the present embodiment.

The memory devices Die_11 to Die_14 may be coupled in common to the first channel CH1. The memory devices Die_11 to Die_14 may communicate with the memory controller 200 through the first channel CH1.

Since the memory devices Die_11 to Die_14 are coupled in common to the first channel CH1, only a single memory device among the memory devices Die_11 to Die_14 may communicate with the memory controller 200 at one time. However, operations internally performed in the respective memory devices Die_11 to Die_14 may be simultaneously performed.

The memory devices Die_21 to Die_24 may be coupled in common to the second channel CH2. The memory devices Die_21 to Die_24 may communicate with the memory controller 200 through the second channel CH2.

Since the memory devices Die_21 to Die_24 are coupled in common to the second channel CH2, only a single memory device among the memory devices Die_21 to Die_24 may communicate with the memory controller 200 at one time. Operations internally performed in the respective memory devices Die_21 to Die_24 may be simultaneously performed.

A storage device which uses a plurality of memory devices may improve performance through data interleaving that is data communication using an interleaving scheme. The data interleaving may be configured to perform a data read or write operation while shifting to ways in a structure in which two or more ways share a single channel with each other. For the data interleaving, the memory devices may be managed on a way basis together with channels. In order to maximize parallelism of memory devices coupled to each channel, the memory controller 200 may distribute and allocate consecutive logical memory areas to channels and ways. For example, the memory controller 200 may transmit control signals, including a command and an address, and data to the memory device Die_11 through the first channel CH1. While the memory device Die_11 is programming the received data to memory cells included therein, the memory controller 200 may transmit control signals, including a command and an address, and data to the memory device Die_12.

In FIG. 4, the plurality of memory devices Die_11 to Die_24 may be configured using four ways WAY1 to WAY4. The first way WAY1 may include the memory devices Die_11 and Die_21. The second way WAY2 may include the memory devices Die_12 and Die_22. The third way WAY3 may include the memory devices Die_13 and Die_23. The fourth way WAY4 may include the memory devices Die_14 and Die_24.

Each of the channels CH1 and CH2 may be a bus for signals, and a bus is shared and used by memory devices coupled to a corresponding channel.

Although, in FIG. 4, data interleaving in a 2-channel/4-way structure is illustrated, data interleaving may be more efficient as the number of channels increases and as the number of ways increases.

Figure 5:
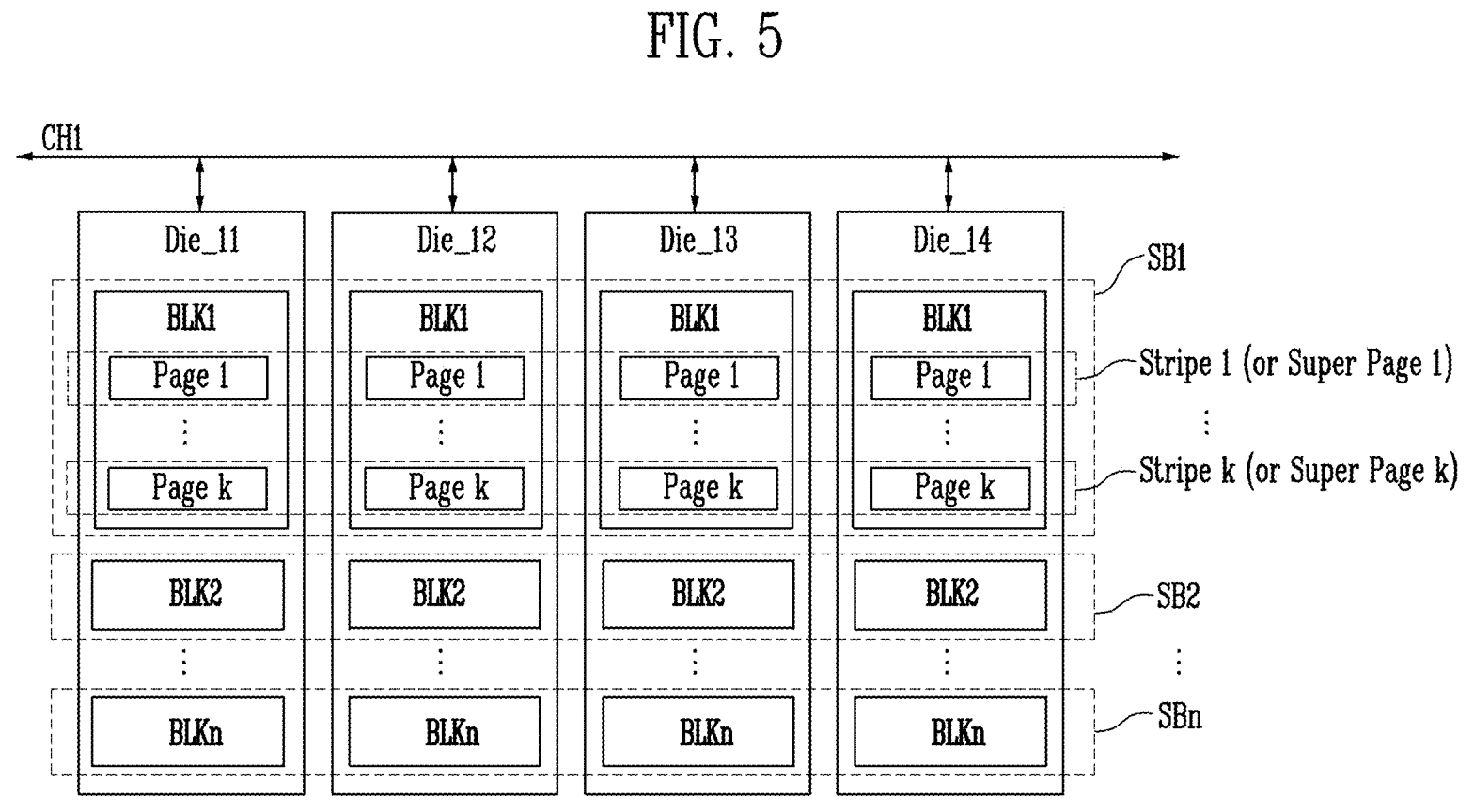

FIG. 5 illustrates a super block according to an embodiment.

Referring to FIG. 5, memory devices Die_11 to Die_14 may be coupled in common to a first channel CH1.

In FIG. 5, each of the memory devices memory devices Die_11 to Die_14 may include one or more planes. However, for convenience of description, it is assumed in the present embodiment that a single memory device includes a single plane. A single plane may include a plurality of memory blocks BLK1 to BLKn (where n is a natural number equal to or greater than 1), and a single memory block may include a plurality of pages Page 1 to Page k (where k is a natural number equal to or greater than 1).

A memory controller may control memory blocks, included in a plurality of memory devices coupled in common to a single channel, on a super block basis. A super block may include at least two memory blocks included in different memory devices.

For example, a first super block SB1 may include first memory blocks BLK1 respectively included in the memory devices Die_11 to Die_14. A second super block SB2 may include second memory blocks BLK2 respectively included in the memory devices Die_11 to Die_14. Similarly, an n-th super block SBn may include n-th memory blocks BLKn respectively included in the memory devices Die_11 to Die_14.

A single super block may include a plurality of stripes. A stripe may be designated as a super page.

Referring to FIG. 5, a single stripe or super page may include a plurality of pages respectively included in the memory devices Die_11 to Die_14. For example, a first stripe Stripe 1 (or first super page Super Page 1) may include respective first pages (Page 1) of the first memory blocks BLK1 included in the first super block SB1.

Therefore, the single super block may include the first stripe Stripe 1 to a k-th stripe Stripe k. Alternatively, the single super block may include the first super page Super Page 1 to a k-th super page Super Page k.

The memory controller may store or read data on a stripe basis or a super page basis when storing data in the memory devices Die_11 to Die_14 or reading stored data from the memory devices Die_11 to Die_14.

Since each memory device includes a plane having a plurality of memory blocks and each super block includes memory blocks belonging to planes of different memory devices, the blocks included in the super block may correspond to multiple planes. In an embodiment, when data is stored in the same super block, the memory controller may perform a multi-plane operation to simultaneously read the memory blocks included in the super block or simultaneously program the memory blocks.

Figure 6:
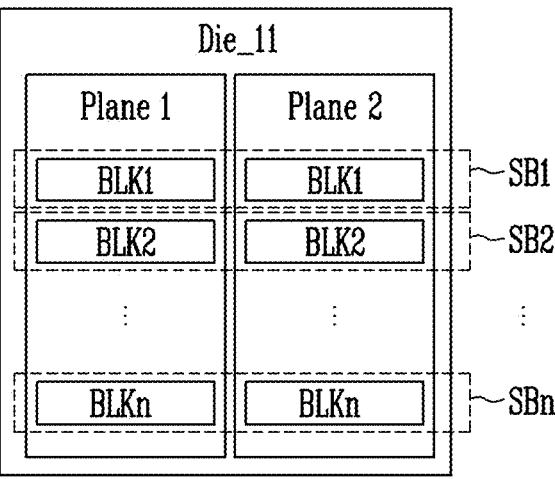
FIG. 6 illustrates a super block according to another embodiment.

FIG. 6 illustrates a super block according to another embodiment.

Referring to FIG. 6, a memory device Die_11 may include multiple planes, e.g., Plane 1 and Plane 2. The number of planes included in a single memory device is not limited to the present embodiment. A single plane may include a plurality of memory blocks BLK1 to BLKn.

A plane may be a unit on which a program operation, a read operation, or an erase operation is independently performed. Therefore, the memory device Die_11 may include the address decoder 121 and the read and write circuit 123, which are described above with reference to FIG. 2, for each of the multiple planes Plane 1 and Plane 2.

In FIG. 6, a super block may include at least two memory blocks included in different planes, among memory blocks included in the multiple planes Plane 1 and Plane 2. The definition of a super block is not limited to the present embodiment.

A first super block SB1 may include first memory blocks BLK1 respectively included in the multiple planes Plane 1 and Plane 2. A second super block SB2 may include second memory blocks BLK2 respectively included in the multiple planes Plane 1 and Plane 2. Similarly, an n-th super block SBn may include n-th memory blocks BLKn respectively included in the multiple planes Plane 1 and Plane 2.

As described above with reference to FIG. 5, each super block may include a plurality of stripes (or super pages). A memory controller may store or read data on a stripe basis or a super page basis when storing data in the multiple planes Plane 1 and Plane 2 or reading stored data from the multiple planes Plane 1 and Plane 2. In other words, the memory device Die_11 may perform operations on the multiple planes Plane 1 and Plane 2 in parallel to implement a multi-plane operation.

Figure 7:
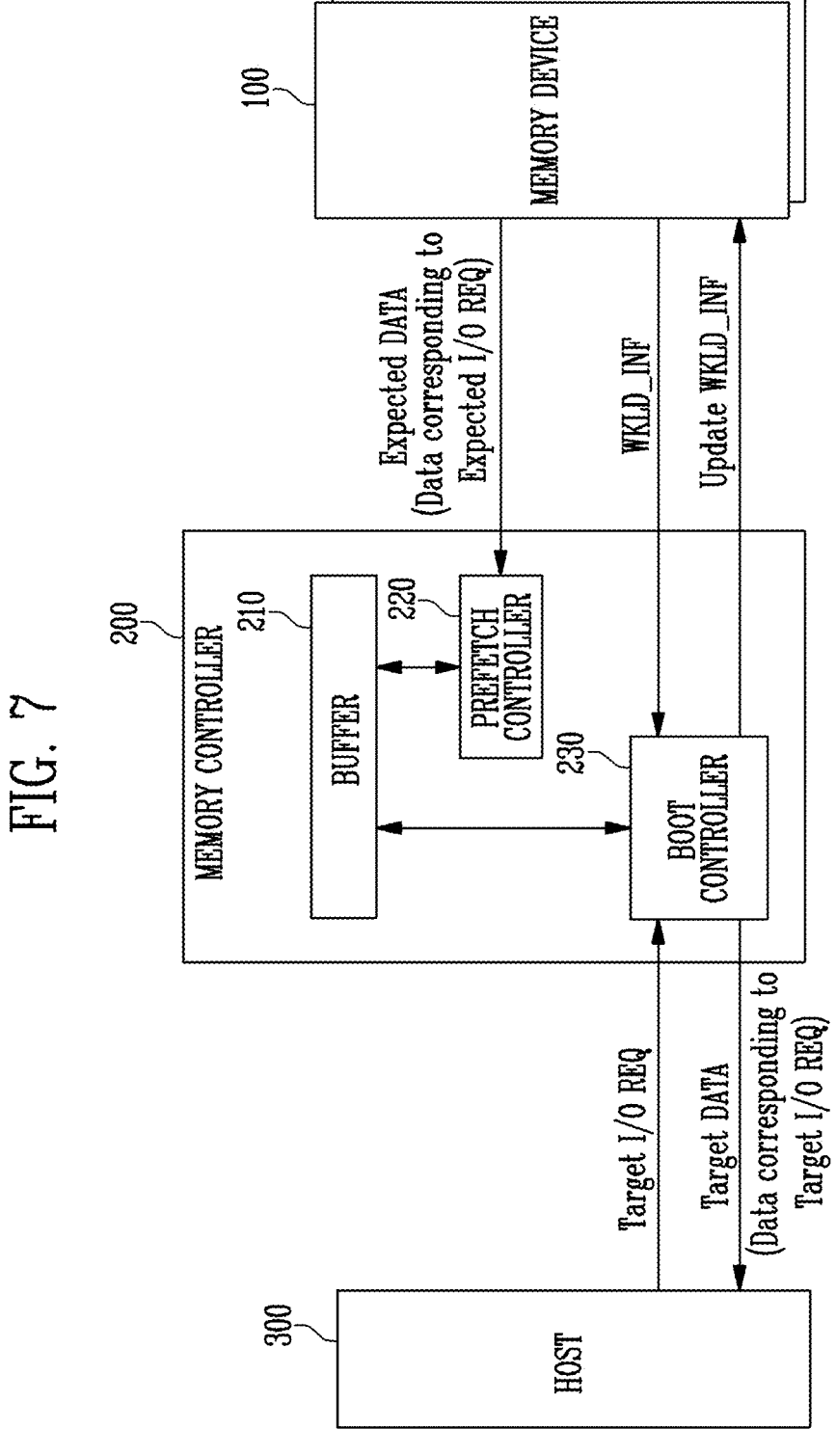
FIG. 7 illustrates an operation of a memory controller of FIG. 1 according to an embodiment.

FIG. 7 illustrates a configuration and an operation of the memory controller 200 of FIG. 1 according to an embodiment.

Referring to FIG. 7, the memory controller 200 may control the plurality of memory devices 100 coupled thereto through one or more channels. Each memory device 100 may include one or more planes. Each plane may include a plurality of memory blocks.

With regard to storage areas, each memory device 100 may include a buffer area and a main area.

The buffer area may include n-bit level cell blocks in which each memory cell stores n data bits (where n is a natural number equal to or greater than 1). The main area may include m-bit cell blocks in which each memory cell stores m data bits (where m is a natural number equal to or greater than n). Since the number of data bits stored in each memory cell included in each block in the buffer area is less than that in the main area, the buffer area has a smaller storage capacity than that of the main area, but it may be accessed faster than the main area.

In order to improve write latency performance, data may be temporarily stored in the buffer area, and thereafter the data stored in the buffer area may be migrated to the main area.

When data is temporarily stored in the buffer area having an access speed higher than that of the main area, write latency may be reduced, but the total number of write operations may increase because data migration must be subsequently performed. In contrast, when data is directly stored in the main area rather than in the buffer area, write latency may increase, but the total number of write operations may decrease because there is no need to subsequently perform a data migration operation. Write cost may be reduced by reducing the write latency or the total number of write operations depending on the purpose of the reduction.

In an embodiment, workload information WKLD_INF may be distributed and stored in respective ones of the plurality of memory devices 100.

In an embodiment, the memory controller 200 may include a buffer 210, a prefetch controller 220, and a boot controller 230.

The buffer 210 may store workload information WKLD_INF including a history of an expected input/output (I/O) request that is expected to be received from the host 300 during a booting operation.

In an embodiment, the workload information WKLD_INF may include at least one of a type of the expected input/output request, a storage range in which the expected input/output request is performed, a frequency with which the expected input/output request occurs during the booting operation, and an expected reception time of the expected input/output request. The storage range in which the expected input/output request is performed may include a start logical address of a logical area in which the expected input/output request is performed, and a length of logical addresses corresponding to the logical area. The length of logical addresses may represent the number of logical addresses defining the logical area in which the expected input/output request is performed.

Before a target input/output request is received from the host 300 after the booting operation starts, the prefetch controller 220 may read expected data corresponding to the expected input/output request from the plurality of memory devices 100 based on the workload information WKLD-_INF. The expected data may include data related to a booting operation on an operating system of the host 300.

The prefetch controller 220 may store the read expected data in the buffer 210. A series of operations such as an operation of reading the expected data stored in the plurality of memory devices 100 and an operation of storing the read expected data in the buffer 210 may be an operation of loading the expected data stored in the plurality of memory devices 100 into the buffer 210.

In an embodiment, the prefetch controller 220 may load the expected data, stored in the plurality of memory devices 100, into the buffer 210, based on a result of a comparison between a time at which the expected input/output request is expected to be received (expected reception time) from the host 300 and a time elapsed since the starting of the booting (boot-on) operation.

After the booting operation starts, the boot controller 230 may read the workload information WKLD_INF stored in the plurality of memory devices 100, and may store the read workload information WKLD_INF in the buffer 210. In other words, the boot controller 230 may load the workload information WKLD_INF, stored in the plurality of memory devices 100, into the buffer 210.

The boot controller 230 may receive the target input/output request from the host 300 after the booting operation starts. The boot controller 230 may process the target input/output request by providing target data, stored in the plurality of memory devices 100 or the buffer 210, to the host 300, the target data corresponding to the target input/output request. For example, when the target data is included in the expected data stored in the buffer 210, the boot controller 230 may provide the target data, stored in the buffer 210, to the host 300. When the target data is not included in the expected data, the boot controller 230 may read the target data stored in the plurality of memory devices 100, and may provide the read target data to the host 300.

The boot controller 230 may update the workload information WKLD_INF stored in the buffer 210 based on the target input/output request depending on whether the target data is included in the expected data. For example, when the target data is not included in the expected data, the boot controller 230 may generate a history of the target input/output request. The boot controller 230 may analyze the association between the target input/output request and the expected input/output request. The boot controller 230 may update the workload information WKLD_INF based on a result of the analysis and the history of the target input/output request.

When the booting operation is completed, the boot controller 230 may store the updated workload information Update WKLD_INF in the plurality of memory devices 100 so that at least one of expected read cost and write cost is minimized.

In an embodiment, the boot controller 230 may store the updated workload information Update WKLD_INF in the same super block, i.e., one super block, so as to minimize the expected read cost. In another embodiment, the boot controller 230 may store the updated workload information Update WKLD_INF in a simultaneously accessible area so as to minimize the expected read cost. In still another embodiment, the boot controller 230 may store the updated workload information Update WKLD_INF in an area in which the number of accesses required to read data is minimized so as to minimize the expected read cost. The super block may include at least two memory blocks included in different memory devices, among the plurality of memory devices 100.

In an embodiment, the boot controller 230 may store the updated workload information Update WKLD_INF in a super block including memory blocks present in the main area, rather than in the buffer area, so as to minimize the write cost. Here, the write cost may correspond to the total number of write operations performed until the updated workload information Update WKLD_INF is written to the main area. For example, when the updated workload information Update WKLD_INF is written to the buffer area and then written to the main area, rather than being directly written to the main area, the total number of write operations may increase, so that the write cost increases.

In an embodiment, the boot controller 230 may store the updated workload information Update WKLD_INF in a super block including memory blocks present in the buffer area, rather than in the main area, so as to minimize the write cost. Here, the write cost may correspond to the write latency.

Figures 8, 9:
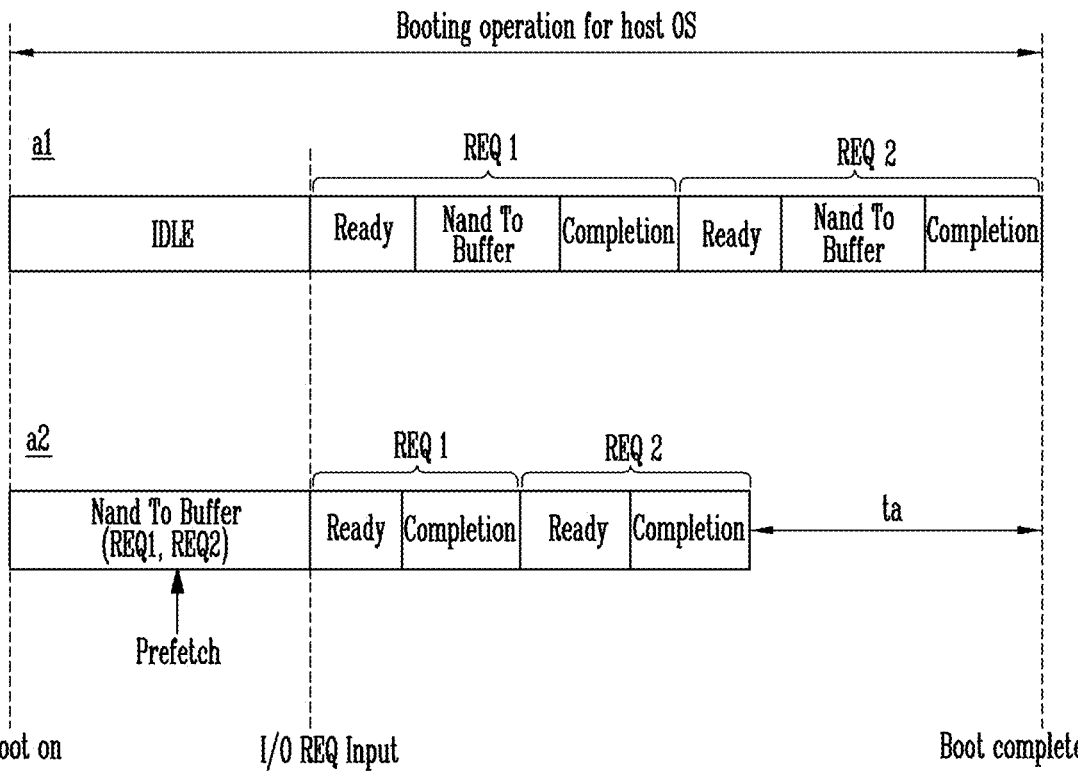
FIG. 8 illustrates workload information of FIG. 7 according to an embodiment.
FIG. 9 illustrates a reduction in a booting time according to data prefetching.

FIG. 8 illustrates the workload information WKLD_INF of FIG. 7 according to an embodiment.

Referring to FIG. 8, the workload information WKLD_INF may include at least one of a type of an expected input/output (I/O) request, a storage range in which the expected input/output request is performed, an expected reception time for the expected input/output request, and a frequency with which the expected input/output request occurs during a booting operation. The type of the expected input/output request may indicate one of a read request and a write request. The storage range in which the expected input/output request is performed may include a start logical address of a logical area in which the expected input/output request is performed, and a length of logical addresses corresponding to the logical area. The length of logical addresses may represent the number of logical addresses defining the logical area in which the expected input/output request is performed. The frequency may represent how many times the expected input/output request occurs.

In FIG. 8, the workload information WKLD_INF may include histories of three expected input/output requests. The number of histories of expected input/output requests included in the workload information WKLD_INF is not limited to the present embodiment.

Referring to FIG. 8, a first expected input/output request is a write request, performed in a logical area (ranging from LBA 50 to LBA 59), and expected to be received from the host at a time t1 after the booting (boot-on) operation starts, and a frequency with which the first expected input/output request is expected to occur during the booting operation is 1.

A second expected input/output request is a read request, performed in a logical area (ranging from LBA 80 to LBA 99), and expected to be received from the host at a time t2 and a time t3 after the booting operation starts, and a frequency with which the second expected input/output request is expected to occur during the booting operation is 2.

A third expected input/output request is a read request, performed in a logical area (ranging from LBA 150 to LBA 179), and expected to be received from the host at a time t4 after the booting starts, and a frequency with which the third expected input/output request is expected to occur during the booting operation is 1.

FIG. 9 illustrates a reduction in a booting time according to data prefetching.

Referring to FIG. 9, a memory controller may process input/output (I/O) requests in first to third periods.

The first period may be a ready period. During the first period, the memory controller may perform an internal preparation operation for processing an input/output request to be received from a host.

A second period may be a NAND-To-Buffer period. The memory controller may read data corresponding to the input/output request from a memory device during the second period, and may store the read data in a buffer.

A third period may be a completion period. The memory controller may provide the data corresponding to the input/output request, which is stored in the buffer, to the host during the third period.

In FIG. 9, the input/output requests received from the host during the booting operation may be first and second requests REQ1 and REQ2.

In a first case a1, the memory controller may be in an idle state from a booting start (boot-on) time to a time at which the first request REQ1 is received from the host. Thereafter, the first and second requests REQ1 and REQ2 may be received and processed.

In a second case a2, the memory controller may predict that the first and second requests REQ1 and REQ2 will be received from the host during the booting operation, and thus may read in advance data corresponding to the first and second requests REQ1 and REQ2 from the memory device and store the read data in the buffer before the first and second requests REQ1 and REQ2 are received, i.e., in a time period corresponding to the idle state of the first case a1. That is, before the first and second requests REQ1 and REQ2 are received from the host, the memory controller may perform a prefetch operation for loading the data corresponding to the first and second requests REQ1 and REQ2 into the buffer.

Compared to the first case a1, in the second case a2, the memory controller may prefetch the data corresponding to the first and second requests REQ1 and REQ2, which are expected to be received from the host, from the memory device before the first and second requests REQ1 and REQ2 are received from the host, so that the booting time is reduced by a time period ta.

Figure 10A:
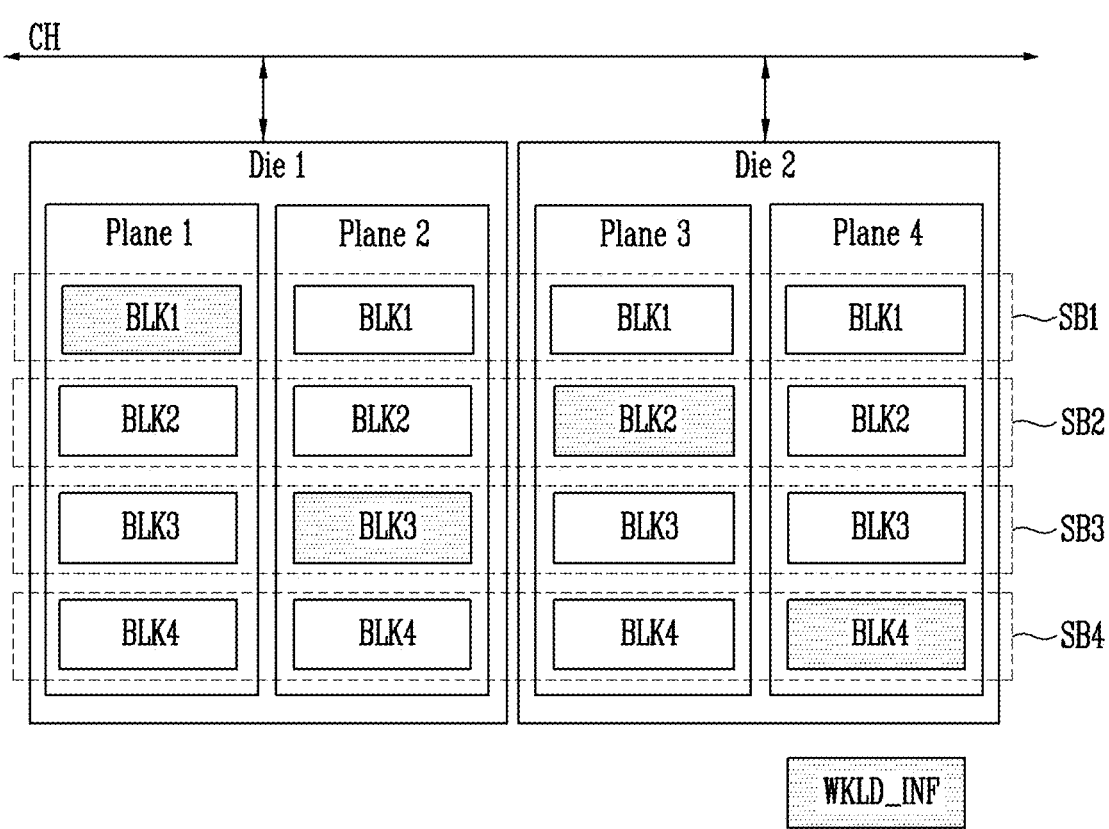
FIG. 10A illustrates a storage status of workload information according to an embodiment.

FIG. 10A illustrates a storage status of workload information according to an embodiment.

Referring to FIG. 10A, workload information WKLD_INF may be distributed and stored in a plurality of memory devices Die 1 and Die 2 coupled to a memory controller through a single channel CH.

In other embodiments, as described above with reference to FIG. 4, a plurality of memory devices may be coupled to the memory controller through a plurality of channels, and the workload information WKLD_INF may be distributed and stored in the plurality of memory devices coupled to the memory controller through the plurality of channels.

Each memory device may include multiple planes. For example, in FIG. 10A, the memory device Die 1 includes two planes Plane 1 and Plane 2, and the memory device Die 2 includes two planes Plane 3 and Plane 4.

A super block may include two or more memory blocks included in different memory devices.

In FIG. 10A, a first super block SB1 may include first memory blocks BLK1 included in the planes Plane 1 to Plane 4 of the memory devices Die 1 and Die 2. A second super block SB2 may include second memory blocks BLK2 included in the planes Plane 1 to Plane 4 of the memory devices Die 1 and Die 2. A third super block SB3 may include third memory blocks BLK3 included in the planes Plane 1 to Plane 4 of the memory devices Die 1 and Die 2. A fourth super block SB4 may include fourth memory blocks BLK4 included in the planes Plane 1 to Plane 4 of the memory devices Die 1 and Die 2.

In FIG. 10A, the workload information WKLD_INF may be distributed and stored in the different super blocks SB1 to SB4, rather than in one super block. Therefore, an operation of reading the workload information WKLD_INF may be performed as a single-plane operation, rather than a multi-plane operation performed on a super block basis.

Figure 10B:
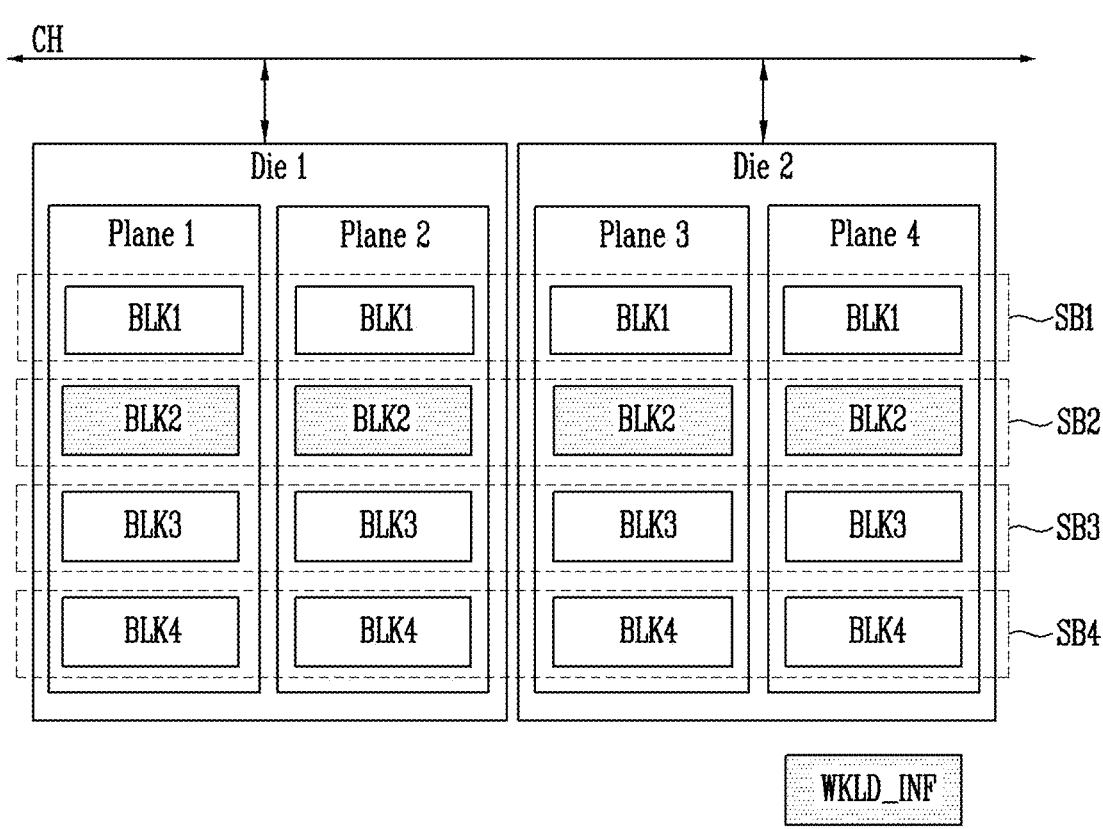
FIG. 10B illustrates a storage status of workload information according to another embodiment.

FIG. 10B illustrates a storage status of workload information according to another embodiment.

Referring to FIG. 10B, workload information WKLD_INF may be stored in one super block SB2 among super blocks SB1 to SB4 of a plurality of memory devices Die 1 and Die 2 coupled to a memory controller through a single channel. Since the workload information WKLD_INF is stored in the same super block SB2, a super block-based multi-plane operation may be performed to read the workload information WKLD_INF stored in the super block SB2.

When the workload information WKLD_INF is stored in an optimized state in one super block as shown in FIG. 10B, rather than in a state in which the workload information WKLD_INF is distributed and stored in different super blocks, as shown in FIG. 10A, expected read cost for reading the workload information WKLD_INF may be minimized, which will be described below with reference to FIG. 11.

FIG. 11 illustrates a reduction in a booting time according to optimized storage of workload information.

Referring to FIG. 11, a first case b1 indicates a NAND-to-Buffer operation when workload information is distributed and stored in different super blocks, as described above with reference to FIG. 10A. A second case b2 indicates a NAND-to-Buffer operation when workload information is distributed and stored in one super block, as described above with reference to FIG. 10B.

Compared to the first case b1, the second case b2 is configured such that an operation of reading workload information is performed as a multi-plane operation rather than a single-plane operation, and thus expected read cost may be minimized and a read operation time required for reading the workload information may be reduced by a time period tb. The total booting time may be reduced in proportion to the reduction in the read operation time.

In other words, the memory controller may re-program the workload information, stored as shown in FIG. 10A, in the optimized state described in FIG. 10B, thus minimizing the expected read cost and shortening the booting time.

FIG. 12 is a flowchart illustrating an operation of a memory controller according to an embodiment.

Referring to FIG. 12, at step S1201, the memory controller may start a booting (boot-on) operation.

At step S1203, the memory controller may load workload information, stored in a memory device, into a buffer. The workload information may include a history of an expected input/output (I/O) request that is expected to be received from a host during the booting operation.

At step S1205, the memory controller may load expected data corresponding to the expected input/output request, stored in the memory device, into the buffer based on the workload information. The expected data may include data related to the booting operation on an operating system of the host.

At step S1207, when a target input/output request is received from the host, the memory controller may determine whether target data corresponding to the target input/output request is included in the expected data loaded into the buffer. When it is determined that the target data is included in the expected data, the operation proceeds to step S1213, whereas when it is determined that the target data is not included in the expected data, the operation proceeds to step S1209.

At S1209, the memory controller may update the workload information loaded into the buffer in response to the target input/output request.

After that, at step S1211, the memory controller may load the target data from the memory device.

At step S1213, the memory controller may process the target input/output request by providing the target data to the host.

After that, at step S1215, the memory controller may determine whether the booting operation has been completed. When it is determined that the booting operation has been completed, the operation proceeds to step S1217, whereas when it is determined that the booting operation is being performed, the operation returns to step S1205.

At step S1217, the memory controller may store the updated workload information, stored in the buffer, in the memory device so that at least one of expected read cost and write cost is minimized. In an embodiment, the memory controller may store the updated workload information in a simultaneously accessible area in the memory device so that the expected read cost is minimized. In another embodiment, the memory controller may store the updated workload information in an area of the memory device in which a multi-plane read operation is available. For example, the memory controller may store the updated workload information in a single super block in which the multi-plane read operation is available.

For example, a storage area of the memory device may include a main area and a buffer area. The buffer area may include n-bit level cell blocks in which each memory cell stores n data bits (where n is a natural number equal to or greater than 1). The main area may include m-bit level cell blocks in which each memory cell stores m data bits (where m is a natural number equal to or greater than n).

In an embodiment, the memory controller may store the updated workload information in memory blocks present in any one of the main area and the buffer area so that the write cost is minimized. The write cost may correspond to the total number of write operations or write latency.

Since the number of data bits stored in each memory cell in the buffer area is less than that in the main area, the buffer area has a smaller storage capacity than that of the main area, but it may be accessed faster than the main area. In order to improve write latency performance, data is temporarily stored in the buffer area, and thereafter the data stored in the buffer area is migrated to the main area.

When data is temporarily stored in the buffer area having an access speed higher than that of the main area, write latency may be reduced, but the total number of write operations may increase because a data migration operation must be subsequently performed. In contrast, when data is directly stored in the main area rather than in the buffer area, write latency may increase, but the total number of write operations may decrease because there is no need to subsequently perform the data migration operation.

In an embodiment, the memory controller may store the updated workload information in memory blocks present in the main area so that the total number of write operations is minimized. In another embodiment, the memory controller may store the updated workload information in memory blocks present in the buffer area so that the write latency is minimized.

FIG. 13 is a flowchart illustrating an operation of a memory controller according to an embodiment.

Referring to FIG. 13, at step S1301, the memory controller may load expected data, stored in a memory device, into a buffer based on a result of a comparison between an expected reception time for an expected input/output (I/O) request, included in workload information, and a time elapsed since the starting of a booting operation. The expected data corresponds to the expected input/output request. In an embodiment, the expected data is loaded from the memory device into the buffer during a time period from a time at which the booting operation starts and a time at which the expected input/output request is received from a host as described above with reference to FIG. 9.

At step S1303, the memory controller may analyze the association between a target input/output request received from a host and the expected input/output request.

At step S1305, the memory controller may update the workload information based on a result of the analysis and a history of the target input/output request. In an embodiment, when target data corresponding to the target input/output request is not included in the expected data loaded into the buffer, the memory controller updates the workload information using the history of the target input/output request.

At step S1307, the memory controller may determine whether the booting operation has been completed. When it is determined that the booting operation has been completed, the operation is terminated, whereas when it is determined that the booting operation is being performed, the operation returns to step S1301.

Figures 14, 15:
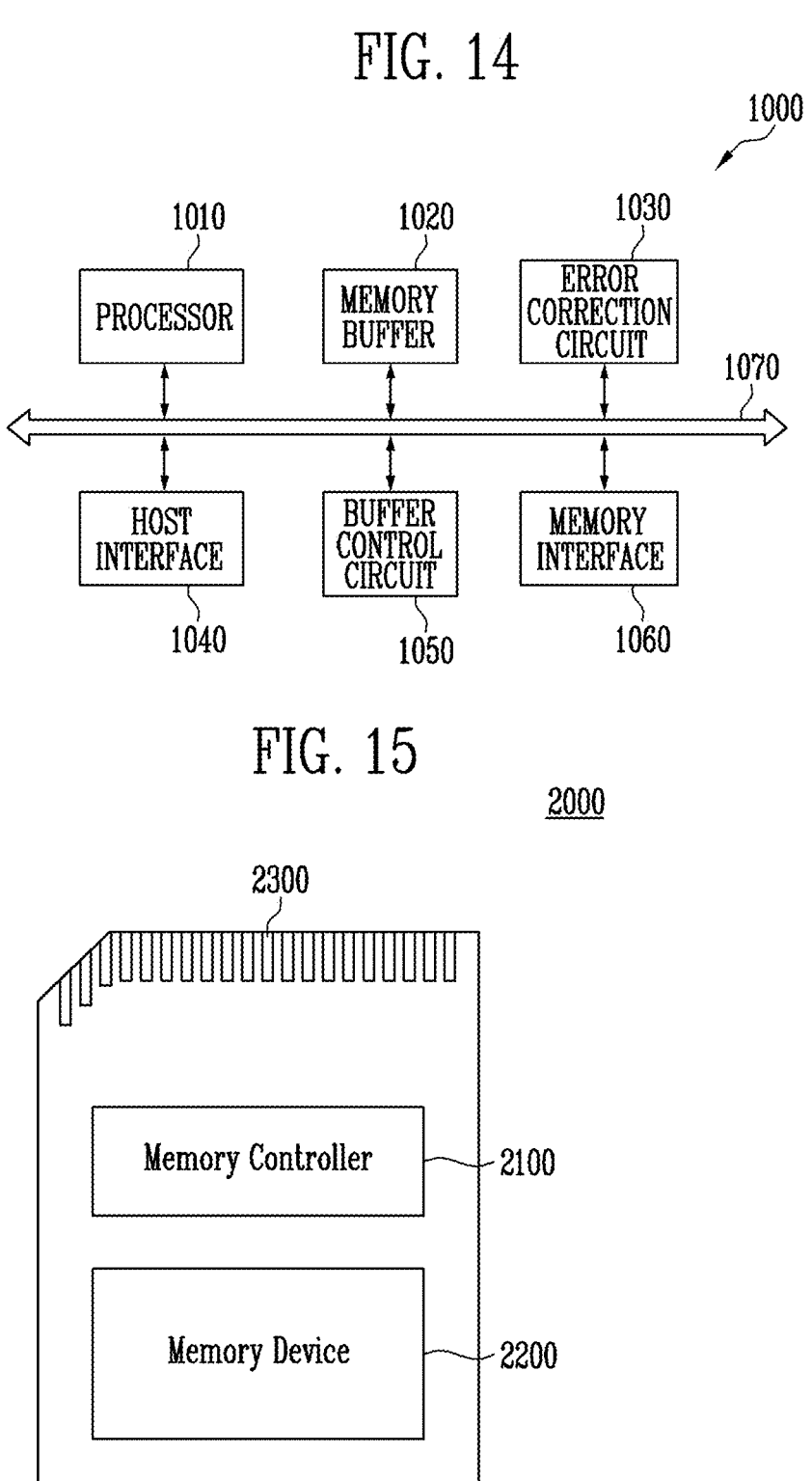
FIG. 14 illustrates the memory controller of FIG. 1 according to an embodiment.
FIG. 15 is a block diagram illustrating a memory card system to which a storage device according to an embodiment of the present disclosure is applied.

FIG. 14 illustrates the memory controller of FIG. 1 according to an embodiment.

A memory controller 1000 of FIG. 14 is coupled to a host and a memory device. In response to a request from the host, the memory controller 1000 may access the memory device. For example, the memory controller 1000 may control read, write, erase, and background operations of the memory device. The memory controller 1000 may provide an interface between the memory device and the host. The memory controller 1000 may run firmware for controlling the memory device.

Referring to FIG. 14, the memory controller 1000 may include a processor 1010, a memory buffer 1020, an error correction circuit (ECC) 1030, a host interface 1040, a buffer control circuit 1050, a memory interface 1060, and a bus 1070.

The bus 1070 may provide a channel between components of the memory controller 1000.

The processor 1010 may control the overall operation of the memory controller 1000 and perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform a function of a flash translation layer (FTL). The processor 1010 may translate a logical block address (LBA), provided by the host, into a physical block address (PBA) through the FTL. The FTL may receive the LBA and translate the LBA into the PBA using a mapping table. Examples of an address mapping method performed through the FTL may include various methods according to a mapping unit. Representative address mapping methods include a page mapping method, a block mapping method, and a hybrid mapping method. The processor 1010 may randomize data received from the host. For example, the processor 1010 may use a randomizing seed to randomize data received from the host. The randomized data may be provided, as data to be stored, to the memory device and may be programmed in a memory cell array of the memory device.

The processor 1010 may derandomize the data received from the memory device during a read operation. For example, the processor 1010 may derandomize the data received from the memory device using a derandomizing seed. Derandomized data may be output to the host.

In an embodiment, the processor 1010 may run software or firmware to perform the randomizing or derandomizing operation.

The memory buffer 1020 may be used as a working memory, a cache memory, or a buffer memory of the processor 1010. The memory buffer 1020 may store codes and commands that are executed by the processor 1010. The memory buffer 1020 may store data that is processed by the processor 1010. The memory buffer 1020 may include a static RAM (SRAM) or a dynamic RAM (DRAM).

The error correction circuit 1030 may perform error correction. The error correction circuit 1030 may perform error correction code (ECC) encoding based on data to be written to the memory device through the memory interface 1060. The ECC-encoded data may be transferred to the memory device through the memory interface 1060. The error correction circuit 1030 may perform ECC decoding based on data received from the memory device through the memory interface 1060. In an example, the error correction circuit 1030 may be included, as the component of the memory interface 1060, in the memory interface 1060.

The host interface 1040 may communicate with the external host under the control of the processor 1010. The host interface 1040 may perform communication using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile Memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may transmit data in the memory controller 1000, and the control bus may transmit control information, such as commands or addresses, in the memory controller 1000. The data bus and the control bus may be separated from each other, and may neither interfere with each other nor influence each other. The data bus may be coupled to the host interface 1040, the buffer control circuit 1050, the error correction circuit 1030, and the memory interface 1060. The control bus may be coupled to the host interface 1040, the processor 1010, the buffer control circuit 1050, the memory buffer 1020, and the memory interface 1060.

FIG. 15 is a block diagram illustrating a memory card system to which a storage device according to an embodiment of the present disclosure is applied.

Referring to FIG. 15, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same manner as the memory controller 200, described above with reference to FIG. 1.

In an embodiment, the memory controller 2100 may include components, such as a RAM, a processor, a host interface, a memory interface, and an error correction circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various interface protocols such as universal serial bus (USB), multimedia card (MMC), embedded MMC (eMMC), peripheral component interconnection (PCI), PCI-express (PCI-E), an advanced technology attachment (ATA) protocol, a serial-ATA (SATA), parallel-ATA (PATA), small computer system interface (SCSI), enhanced small disk interface (ESDI), integrated drive electronics (IDE), fire-wire, universal flash storage (UFS), WIFI, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

The memory controller 2100 and the memory device 2200 may be integrated into a single semiconductor device to form a memory card. For example, the memory controller 2100 and the memory device 2200 may be integrated into a single semiconductor device and may then form a memory card such as a personal computer memory card international association (PCMCIA), a compact flash card (CF), a smart media card (SM or SMC), a memory stick multimedia card (MMC, RS-MMC, MMCmicro or eMMC), a SD card (SD, miniSD, microSD, or SDHC), a universal flash storage (UFS), or the like.

Figure 16:
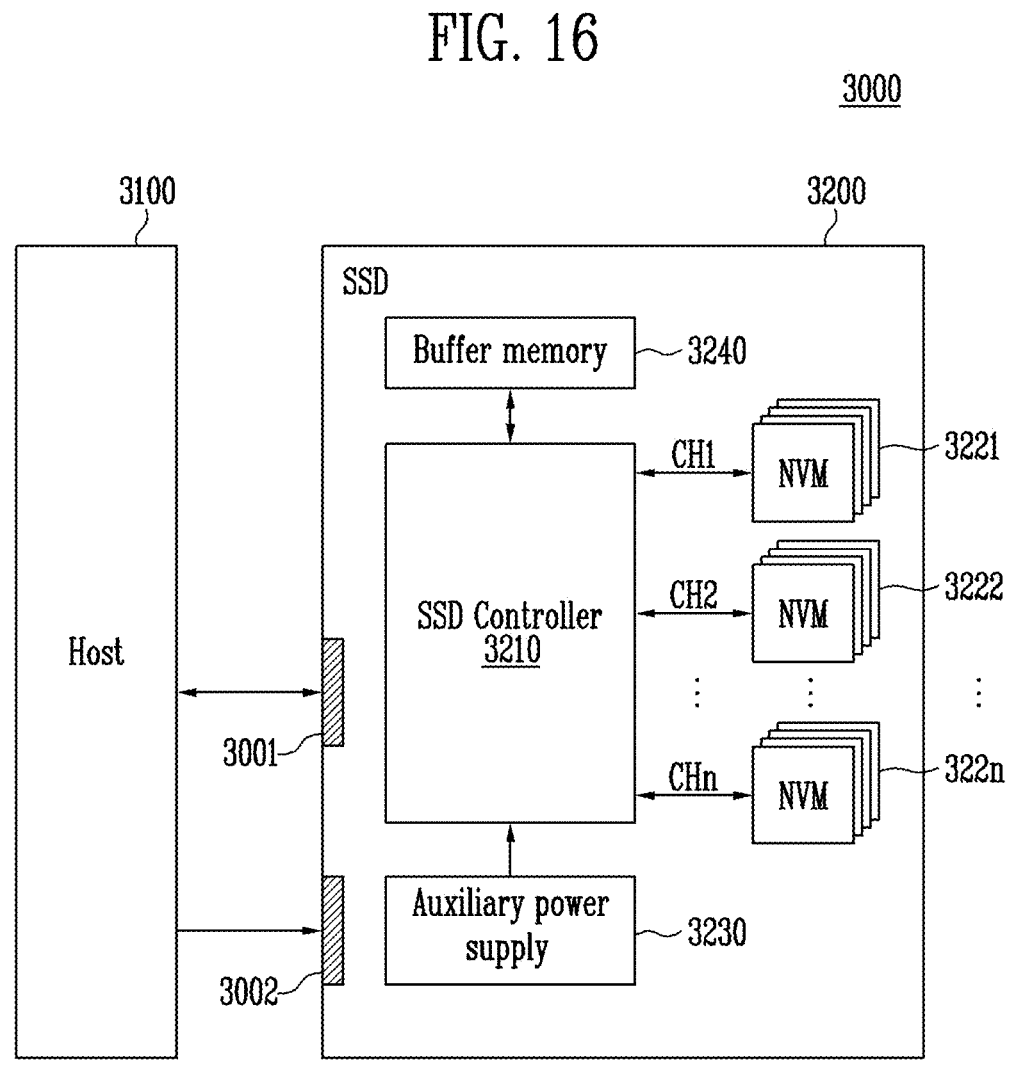

FIG. 16 is a block diagram illustrating a solid-state drive (SSD) system to which a storage device according to an embodiment of the present disclosure is applied.

Referring to FIG. 16, an SSD system 3000 may include a host 3100 and an SSD 3200. The SSD 3200 may exchange a signal SIG with the host 3100 through a signal connector 3001, and may receive power PWR through a power connector 3002. The SSD 3200 may include an SSD controller 3210, a plurality of flash memories 3221 to 322*n*, an auxiliary power supply 3230, and a buffer memory 3240.

In accordance with an embodiment of the present disclosure, the SSD controller 3210 may perform the function of the memory controller 200, described above with reference to FIG. 1.

The SSD controller 3210 may control the plurality of flash memories 3221 to 322*n* in response to the signal SIG received from the host 3100. In an embodiment, the signal SIG may indicate signals based on the interfaces of the host 3100 and the SSD 3200. For example, the signal SIG may be a signal defined by at least one of various interfaces such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer system interface (SCSI), enhanced small disk interface (ESDI), integrated drive electronics (IDE), firewire, universal flash storage (UFS), WiFi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged. The auxiliary power supply 3230 may supply the power of the SSD 3200 when the supply of power from the host 3100 is not smoothly performed. In an embodiment, the auxiliary power supply 3230 may be located inside the SSD 3200 or located outside the SSD 3200. For example, the auxiliary power supply 3230 may be located in a main board, and may also provide auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322*n*, or may temporarily store metadata (e.g., mapping tables) of the flash memories 3221 to 322*n*. The buffer memory 3240 may include volatile memories, such as DRAM, SDRAM, DDR SDRAM, LPDDR SDRAM, and GRAM, or nonvolatile memories, such as FRAM, ReRAM, STT-MRAM, and PRAM.

Figure 17:
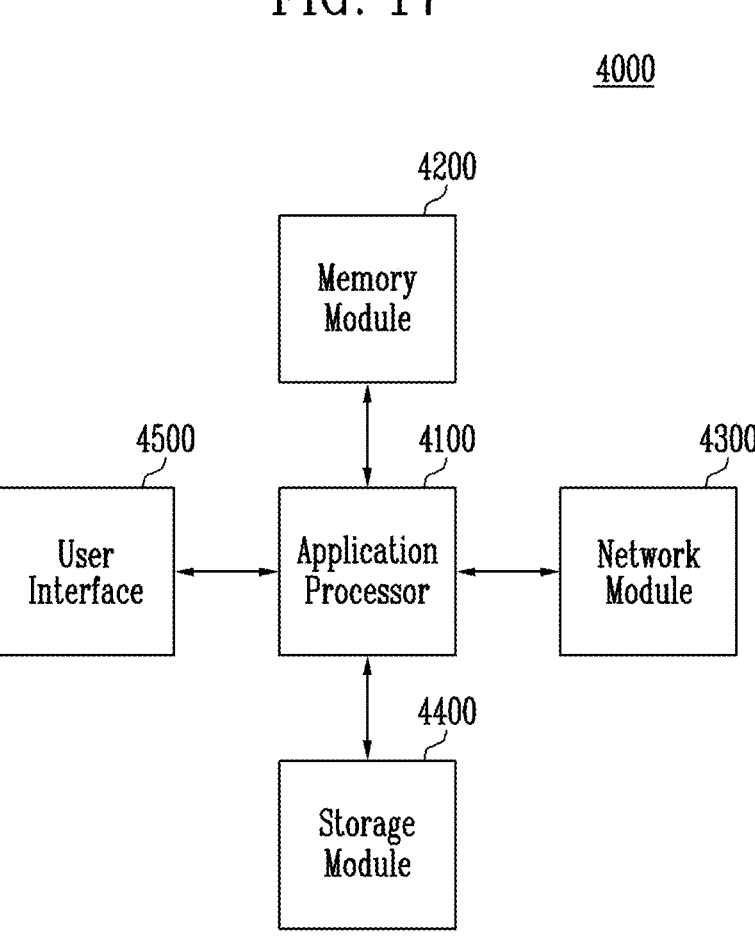
FIG. 17 is a block diagram illustrating a user system to which a storage device according to an embodiment of the present disclosure is applied.

FIG. 17 is a block diagram illustrating a user system to which a storage device according to an embodiment of the present disclosure is applied.

Referring to FIG. 17, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be formed of a system-on-chip (SoC).

The memory module 4200 may act as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM or nonvolatile RAMs such as PRAM, ReRAM, MRAM, and FRAM. In an embodiment, the application processor 4100 and the memory module 4200 may be packaged based on a package-on-package (POP), and may then be provided as a single semiconductor package.

The network module 4300 may communicate with external devices. In an embodiment, the network module 4300 may support wireless communication, such as Code Division Multiple Access (CDMA), Global System for Mobile communication (GSM), wideband CDMA (WCDMA), CDMA-2000, time division multiple access (TDMA), long term evolution (LTE), Wimax, WLAN, UWB, Bluetooth, or WI-FI. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (removable drive), such as a memory card or an external drive of the user system 4000.

In an embodiment, the storage module 4400 may include a plurality of nonvolatile memory devices, each of which may be operated in the same manner as the memory device 100, described above with reference to FIG. 1. The storage module 4400 may be operated in the same manner as the storage device 50, described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may further include user output interfaces such as a Liquid Crystal Display (LCD), an organic light emitting diode (OLED) display device, an active matrix OLED (AMOLED) display device, an LED, a speaker, and a monitor.

In accordance with the present disclosure, there are provided a memory controller having optimized boot performance and a method of operating the memory controller.

What is claimed is:

1. A memory controller for controlling a plurality of memory devices, the memory controller comprising:
   a buffer configured to store workload information including a history of an expected input/output request from a host during a booting operation;
   a prefetch controller configured to, before a target input/output request is received from the host, prefetch, in the buffer, expected data corresponding to the expected input/output request based on the workload information including a result of a comparison between an expected reception time of the expected input/output request and a time elapsed since starting of the booting operation; and
   a boot controller configured to update the workload information based on the target input/output request, and to store updated workload information in the plurality of the memory devices.

2. A memory controller for controlling a plurality of memory devices, the memory controller comprising:
   a buffer configured to store workload information including a history of an expected input/output request from a host during a booting operation;

a prefetch controller configured to, before a target input/output request is received from the host, prefetch, in the buffer, expected data corresponding to the expected input/output request based on the workload information and a result of a comparison between an expected reception time of the expected input/output request and a time elapsed since starting of the booting operation; and
   a boot controller configured to provide, in response to the target input/output request received from the host, a response indicating whether target data corresponding to the target input/output request is included in the expected data to the host, and update the workload information based on the target input/output request.

3. A memory controller for controlling a plurality of memory devices, the memory controller comprising:
   a buffer configured to store workload information including a history of an expected input/output request from a host during a booting operation;
   a prefetch controller configured to, before a target input/output request is received from the host, prefetch, in the buffer, expected data corresponding to the expected input/output request based on the workload information and a result of a comparison between an expected reception time of the expected input/output request and a time elapsed since starting of the booting operation; and
   a boot controller configured to generate a history of the target input/output request when target data corresponding to the target input/output request is not included in the expected data, and to update the workload information based on the history of the target input/output request and a result of analysis of association between the target input/output request and the expected input/output request, and to store updated workload information in the plurality of the memory devices.

4. The memory controller according to claim 3, wherein the boot controller is configured to read the target data from the plurality of the memory devices, and to provide the target data to the host when the target data is not included in the expected data.

* * * * *